(12) United States Patent
Yuk

(10) Patent No.: US 9,118,472 B2
(45) Date of Patent: Aug. 25, 2015

(54) METHOD OF TRANSMITTING CONTROL INFORMATION IN WIRELESS COMMUNICATION SYSTEM

(75) Inventor: Young Soo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 2110 days.

(21) Appl. No.: 12/179,436

(22) Filed: Jul. 24, 2008

(65) Prior Publication Data

US 2009/0040999 A1 Feb. 12, 2009

(30) Foreign Application Priority Data

Aug. 7, 2007 (KR) .................... 10-2007-0078902

(51) Int. Cl.
| | |
|---|---|
| *H04J 3/00* | (2006.01) |
| *H04L 1/16* | (2006.01) |
| *H04L 1/00* | (2006.01) |
| *H04L 1/18* | (2006.01) |
| *H04L 25/02* | (2006.01) |
| *H04L 1/12* | (2006.01) |

(52) U.S. Cl.
CPC ............ *H04L 1/1664* (2013.01); *H04L 1/0081* (2013.01); *H04L 1/1671* (2013.01); *H04L 1/1812* (2013.01); *H04L 25/0226* (2013.01); *H04L 25/0228* (2013.01); *H04L 2001/125* (2013.01)

(58) Field of Classification Search
None
See application file for complete search history.

(56) References Cited

U.S. PATENT DOCUMENTS

| 7,158,802 | B2 * | 1/2007 | Dick et al. ..................... 455/509 |
| 2005/0201319 | A1 * | 9/2005 | Lee et al. ..................... 370/321 |
| 2005/0250506 | A1 * | 11/2005 | Beale et al. ................ 455/452.1 |

OTHER PUBLICATIONS

"3GPP TS 25.221," Technical Specification Group Radio Access Network; Physical channels and mapping of transport channels onto physical channels (TDD), V7.0.0, (Mar. 2006), pp. 1-139.*

* cited by examiner

*Primary Examiner* — John Blanton
*Assistant Examiner* — Alan Lindenbaum
(74) *Attorney, Agent, or Firm* — Lee, Hong, Degerman, Kang & Waimey

(57) ABSTRACT

A method of transmitting control information in a wireless communication system includes configuring a burst including data symbols and a midamble and transmitting the burst through an uplink shared channel. The data symbols and the midamble carry the same control information. Even if control information is transmitted on an uplink shared channel, reception errors in a base station can be reduced by improving transmission reliability.

11 Claims, 8 Drawing Sheets

FOR ACK SIGNAL

FOR NACK SIGNAL

METHOD OF TRANSMITTING CONTROL INFORMATION IN WIRELESS COMMUNICATION SYSTEM

CROSS-REFERENCE TO RELATED APPLICATIONS

This application claims the benefit of priority of Korean Patent Application No. 10-2007-0078902 filed on Aug. 7, 2007, which is incorporated by reference in its entirety herein.

BACKGROUND

1. Technical Field

The present invention relates to wireless communications, and more particularly, to a method of transmitting control information in a wireless communication system.

2. Related Art

Today, wireless communication systems have been evolving from the early voice-oriented services into high-speed, high-quality wireless data packet communication systems for providing data services and multimedia services. Moreover, for next generation wireless communication systems, standardization is in progress for high-speed, high quality wireless data packet services. High speed downlink packet access (HSDPA) represents an evolution of the existing asynchronous international mobile telecommunications (IMT)-2000 standard and is an access scheme which is additionally provided for high-speed downlink data transmission. The HSDPA is classified into a frequency division duplex (FDD) HSDPA and a time division duplex (TDD) HSDPA. The TDD HSDPA can support a chip rate of 3.84 million chips per second (Mcps) or 1.28 Mcps. In the TDD HSDPA, uplink and/or downlink resources can be asymmetrically allocated. Thus, when downlink channels are allocated to the maximum extent possible, transmission can be achieved in a most efficient manner with the introduction of the HSDPA.

The HSDPA includes adaptive modulation and coding (AMC), hybrid automatic repeat request (HARQ), etc. The HARQ is a combination of automatic repeat request (ARQ) and channel coding of a physical layer. In the HARQ, a user equipment (UE) receives packet data from a base station (BS) and then informs the BS of whether the data is successfully received or not, so that the BS retransmits the packet data when necessary. According to the HARQ, original packet data is combined with the retransmitted packet data by using at least one of chase combining, full incremental redundancy, and partial incremental redundancy, thereby improving decoding performance. In the chase combining, the retransmitted packet data is the same as the original packet data. In the full incremental redundancy and the partial incremental redundancy, the retransmitted packet data is different from the original packet data. In particular, in the partial incremental redundancy, packet data that cannot be self-decoded is retransmitted.

A high speed downlink shared channel (HS-DSCH) is a downlink transport channel for supporting the HSDPA. The HS-DSCH is associated with at least one high speed shared control channel (HS-SCCH) which is a "shared control channel for HS-DSCH". The HS-SCCH is a downlink physical channel for carrying upper-layer control information for the HS-DSCH.

A high speed shared information channel (HS-SICH), which is a "shared information channel for HS-DSCH", is an uplink physical channel for carrying an acknowledgment (ACK)/negative-acknowledgment (NACK) signal. The ACK/NACK signal is used when the UE informs the BS of whether packet data transmitted on the HS-DSCH is successfully received. High reliability is required when transmitting the ACK/NACK signal because the HARQ may be mistakenly performed due to erroneous ACK/NACK detection. For example, when the UE transmits the NACK signal but the BS recognizes it as the ACK signal, data may be lost.

In an FDD-based wireless communication system, the ACK/NACK signal is transmitted by using a high speed dedicated physical control channel (HS-DPCCH) which is a "dedicated physical control channel for HS-DSCH". In most cases, the HS-DPCCH is used along with a dedicated channel (DCH) or an enhanced dedicated channel (E-DCH) instead of being used alone. Since high power is generally allocated to the DCH or the E-DCH, transmit power for the HS-DPCCH is decreased by an amount of the power allocated to the DCH or the E-DCH. Therefore, the reception performance of the BS may be deteriorated. This problem can be solved by repeatedly transmitting the ACK/NACK signal because the HS-DPCCH is a dedicated channel.

In a TDD-based wireless communication system, the ACK/NACK signal is transmitted on the HS-SICH. The DCH or the E-DCH may also be used. Similarly to the FDD-based wireless communication system, high power is allocated to the DCH or the E-DCH in most cases. Thus, transmit power for the HS-SICH is decreased by an amount of the allocated power, which may lead to deterioration in reception performance of the BS. However, unlike the FDD-based wireless communication system, the HS-SICH is a common channel shared by a plurality of UEs. Thus, it is difficult to assign the HS-SICH to one UE several times for repetitive transmission such as in the HS-DPCCH.

Accordingly, there is a need for a method capable of improving reliability when the ACK/NACK signal is transmitted on the HS-SICH.

SUMMARY

The present invention provides a method of improving transmission reliability of uplink control information in a wireless communication system.

According to an aspect of the present invention, a method of transmitting control information in a wireless communication system is provided. The method includes configuring a burst including data symbols and a midamble, wherein the data symbols and the midamble carry the same control information and transmitting the burst through an uplink shared channel.

According to another aspect of the present invention, a method of performing hybrid automatic repeat request (HARQ) in a wireless communication system is provided. The method includes receiving downlink data; and transmitting an acknowledgment (ACK)/negative acknowledgement (NACK) signal for the downlink data through a burst, wherein the burst includes data symbols and a midamble, and the ACK/NACK signal is carried on the midamble along with the data symbols.

DESCRIPTION OF EXEMPLARY EMBODIMENTS

Figure 1:
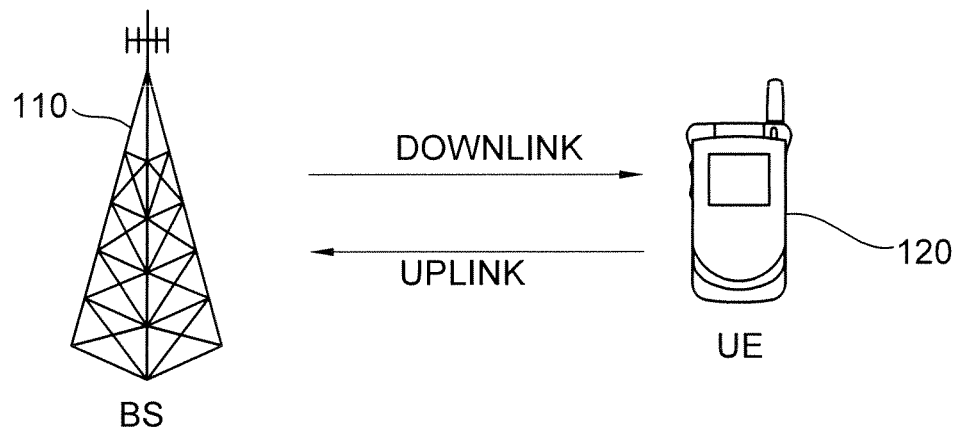
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 110 and a user equipment (UE) 120. The BS 110 is generally a fixed station that communicates with the UE 120 and may be referred to as another terminology, such as a node-B, a base transceiver system (BTS), an access point, etc. The UE 120 may be fixed or mobile and may be referred to as another terminology, such as a mobile station (MS), a user terminal (UT), a subscriber station (SS), a wireless device, etc.

Hereinafter, downlink is defined as communication link from the BS 110 to the UE 120, and uplink is defined as communication link from the UE 120 to the BS 110. In downlink, a transmitter may be a part of the BS 110 and a receiver may be a part of the UE 120. In uplink, the transmitter may be a part of the UE 120 and the receiver may be a part of the BS 110.

Figure 2:
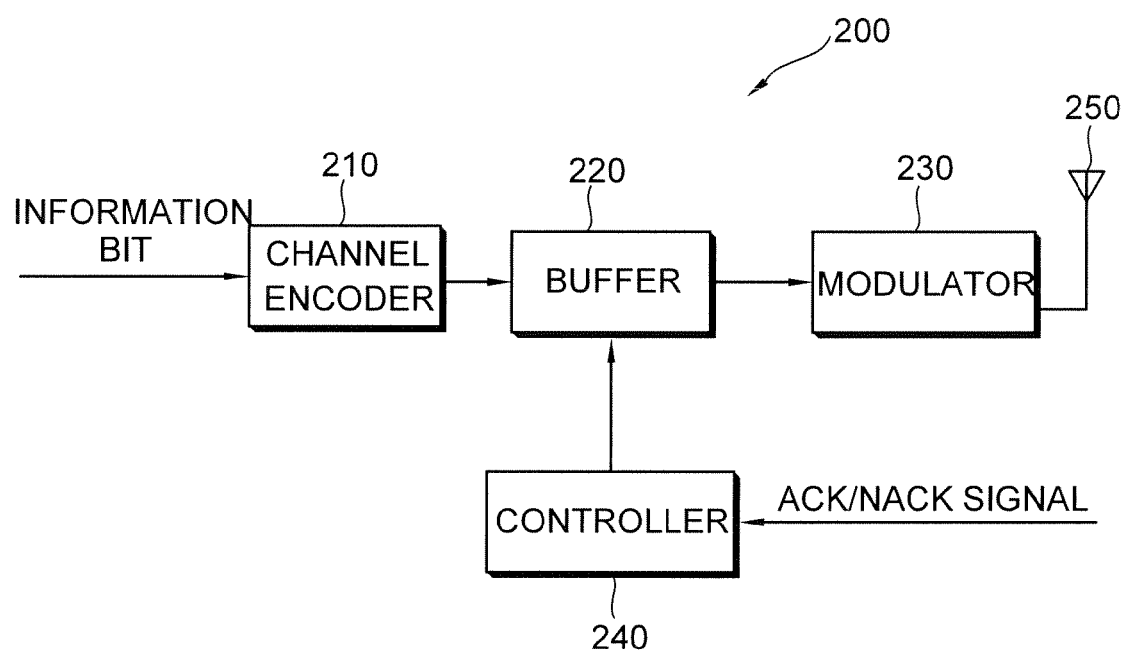
FIG. 2 is a block diagram showing a transmitter according to an embodiment of the present invention.

FIG. 2 is a block diagram showing a transmitter according to an embodiment of the present invention.

Referring to FIG. 2, a transmitter 200 includes a channel encoder 210, a buffer 220, a modulator 230, and a controller 240. The channel encoder 210 receives information bits, encodes the information bits according to a specific coding rate, and generates coded data. The information bits may include text, audio, video, or other data. The channel encoder 210 appends error detection bits (e.g., cyclic redundancy check (CRC)) to the information bits. Further, the channel encoder 210 may append an extra code for error correction. The error correction code may be a turbo code. The turbo code is a systematic code including the information bits as systematic bits. If the turbo code has a code rate of 1/3, two parity bits are assigned to one systematic bit. The error correction code is not limited to the turbo code. Thus, the present invention may also be applied when a low density parity check code (LDPC) or other convolution codes are used. An interleaver (not shown) may be coupled to an output node of the channel encoder 210. The interleaver mixes the coded data to reduce noise derived from a channel.

The buffer 220 stores the data encoded by the channel encoder 210. Further, the buffer 220 outputs required data under the control of the controller 240. Although the buffer 220 is coupled to the output node of the channel encoder 210 in FIG. 2, the buffer 220 may be coupled to an input node of the channel encoder 210.

The modulator 230 modulates the data output from the buffer 220 according to a specific modulation scheme such as quadrature phase shift keying (QPSK), 16-quadrature amplitude modulation (QAM), etc., and transmits the data through a transmit antenna 250.

The controller 240 determines data to be output from the buffer 220. If the controller 240 receives an acknowledgment (ACK) signal from a receiver 300 (see FIG. 3), new data is transmitted. On the other hand, if the controller 240 receives a negative-acknowledgment (NACK) signal from the receiver 300, initial data stored in the buffer 220 is retransmitted according to a hybrid automatic repeat request (HARQ) scheme.

Figure 3:
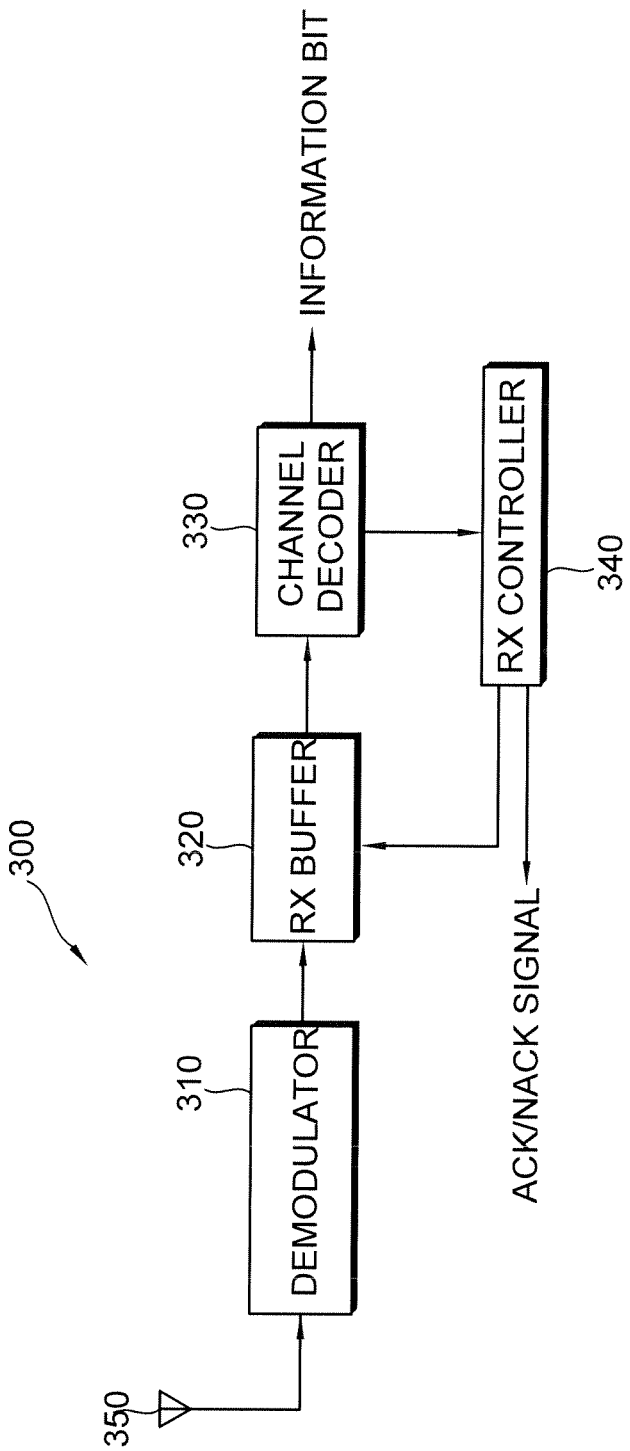
FIG. 3 is a block diagram showing a receiver according to an embodiment of the present invention.

FIG. 3 is a block diagram showing a receiver according to an embodiment of the present invention.

Referring to FIG. 3, a receiver 300 includes a demodulator 310, a receive (Rx) buffer 320, a channel decoder, and an Rx controller 340. The demodulator 310 receives data through a receive antenna 350, demodulates the data according to a demodulation scheme corresponding to the modulation scheme used in the transmitter 200 (see FIG. 2), and outputs the data to the Rx buffer 320.

The Rx buffer 320 stores the data output from the demodulator 310. The Rx buffer 320 delivers the stored data to the channel decoder 330 under the control of the Rx controller 340. Although the Rx buffer 320 is coupled to an input node of the channel decoder 330 in FIG. 3, the Rx buffer 320 may be coupled to an output node of the channel decoder 330.

The channel decoder 330 decodes the received data according to the coding rate used in the transmitter 200 (see FIG. 2) and outputs information bits of the data. Further, the channel decoder 330 performs error checking on the information bits of the data and provides the error checking result to the Rx controller 340.

The Rx controller 340 controls the Rx buffer 320, and transmits an ACK/NACK signal through a shared control channel. The shared control channel may be a high speed shared information channel (HS-SICH) which is a "shared information channel for HS-DSCH". If errors are not detected from the data, the ACK signal is transmitted to the transmitter 200. Otherwise, the NACK signal is transmitted to the transmitter 200.

Figure 4:
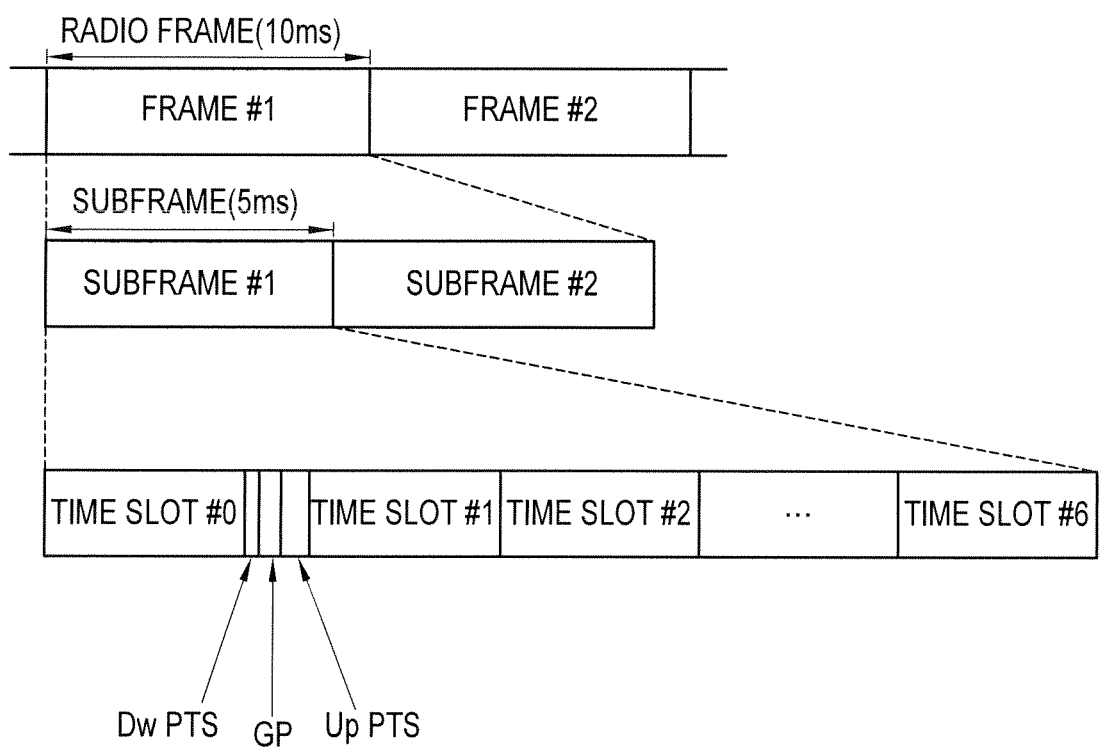
FIG. 4 shows an example of a structure of a radio frame in a time division duplex (TDD) wireless communication system.

FIG. 4 shows an example of a structure of a radio frame in a time division duplex (TDD) wireless communication system.

Referring to FIG. 4, a radio frame includes two subframes. The radio frame has a duration of 10 ms. The subframe has a duration of 5 ms. The two subframes have the same duration and the same structure. The subframe includes 7 time slots. The time slot can be classified into an uplink time slot for uplink transmission and a downlink time slot for downlink transmission. Since the uplink time slot and the downlink time slot are arranged in the same frequency band at different time, it is called time division duplex (TDD).

The subframe includes 7 time slots #0 to #6. Among the 7 time slots, the time slot #0 is always allocated to downlink and the time slot #1 is always allocated to uplink. The time slot #2 to the time slot #6 can be allocated to either uplink or downlink. A downlink pilot time slot (DwPTS), a guard period (GP), and an uplink pilot time slot (UpPTS) are provided between the time slot #0 and the time slot #1. The DwPTS is used for initial cell search, synchronization, or channel estimation performed in a UE. The UpPTS is used for channel estimation performed in a BS and uplink transmission synchronization of the UE. The GP is used to cancel interference that occurs in uplink due to a multi-path delay of a downlink signal while uplink and downlink communications are performed.

A burst consists of two data symbols, a midamble, and a GP. A duration of one burst is one time slot.

In the TDD wireless communication system, the total number and length of radio frames, subframes, time slots, or switching points are not limited to the above mentioned examples. Therefore, the total number and length of the radio frames, the subframes, the switching points, or the time slots may vary depending on situations.

Figure 5:
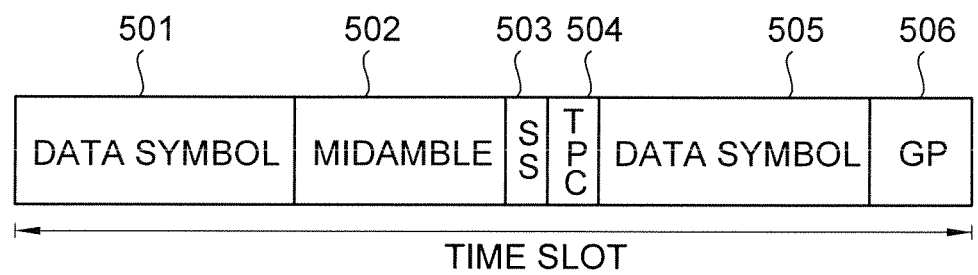
FIG. 5 shows a structure of a burst for a high speed shared information channel (HS-SICH).

FIG. 5 shows a structure of a burst for an HS-SICH. The HS-SICH is an uplink physical channel for a high speed downlink shared channel (HS-DSCH), and is used to transmit a channel quality indicator (CQI) or an ACK/NACK signal for HARQ. The HS-SICH is an uplink shared channel.

Referring to FIG. 5, the burst used in the HS-SICH includes data symbols 501 and 505, a midamble 502, a synchronization shift (SS) 503, a transmit power control (TPC) 504, and a guard period (GP) 506.

The data symbols 501 and 505 are used to transmit data (i.e., the CQI and the ACK/NACK signal). The midamble 502 is used to identify UEs that use the same time slots and/or to estimate a channel for data demodulation. The midamble 502 is also referred to as a reference signal or a pilot. The GP 506 is an interval for distinguishing a time slot for current transmission from a subsequent time slot for next transmission. If an uplink time slot is followed by a downlink time slot, or vice versa, the GP 506 distinguishes the time slots so that an interference signal is not produced between the time slots. The SS 503 is used to transmit a command for adjusting synchronization when an out-of-synch condition occurs due to changes in a distance between a UE and a BS or due to other reasons. The TPC 504 is used to control downlink power of the BS in uplink transmission. Each of the data symbols 501 and 505 may have a duration of 352 chips. The midamble 502 may have a duration of 144 chips. The GP 506 may have a duration of 16 chips.

The burst for the HS-SICH has 16 spreading factors (SFs), and a total of 88 bits are assigned for each time slot. That is, 2 bits are assigned for the SS 503, 2 bits are assigned for the TPC 504, and 84 bits are assigned for the two data symbols 501 and 505. A 48-bit CQI and a 36-bit ACK/NACK signal are assigned for the two data symbols 501 and 505. A 1-bit recommended modulation format (RMF) and a 6-bit recommended transport block size (RTBS) are channel-encoded to form the 48-bit CQI. Specifically, the 1-bit RMF is extended to 16 bits by using a repetition code, and the 6-bit RTBS is extended to 32 bits by using a Reed-Muller code, that is, 48 bits in total. The 1-bit ACK/NACK signal is extended to 36 bits by using the repetition code.

The ACK/NACK signal can be carried on not only the two data symbols 501 and 505 but also the midamble. There are various possible methods for carrying the ACK/NACK signal on the midamble.

According to an embodiment, ACK/NACK signals can be identified by using a phase of a midamble. For example, a midamble for the ACK signal may have a different phase from that of the NACK signal.

Table 1 below shows basic midamble codes for 1.28 Mcps TDD which is disclosed in the AA.1 clause of the 3GPP TS 25.221 V 7.3.0 (May 2007) Technical Specification Group Radio Access Network; Physical channels and mapping of transport channels onto physical channels (TDD) (Release 7).

TABLE 1

| Code ID | Basic Midamble Codes $m_P$ of length P = 128 |
|---|---|
| $m_{P0}$ | B2AC420F7C8DEBFA69505981BCD028C3 |
| $m_{P1}$ | 0C2E988E0DBA046643F57B0EA6A435E2 |
| $m_{P2}$ | D5CEC680C36A4454135F86DD37043962 |
| $m_{P3}$ | E150D08CAC2A00FF9B32592A631CF85B |
| $m_{P4}$ | E0A9C3A8F6E40329B2F2943246003D44 |
| $m_{P5}$ | FE22658100A3A683EA759018739BD690 |
| $m_{P6}$ | B46062F89BB2A1139D76A1EF32450DA0 |
| $m_{P7}$ | EE63D75CC099092579400D956A90C3E0 |
| $m_{P8}$ | D9C0E040756D427A2611DAA35E6CD614 |
| $m_{P9}$ | EB56D03A498EC4FEC98AE220BC390450 |
| $m_{P10}$ | F598703DB0838112ED0BABB98642B665 |
| $m_{P11}$ | A0BC26A992D4558B9918986C14861EFF |
| $m_{P12}$ | 541350D109F1DD68099796637B824F88 |
| $m_{P13}$ | 892D344A962314662F01F9455F7BC302 |
| $m_{P14}$ | 49F270E29CCD742A40480DD4215E1632 |
| $m_{P15}$ | 6A5C0410C6C39AA04E77423C355926DE |
| $m_{P16}$ | 7976615538203103D4DBCC219B16A9E1 |
| $m_{P17}$ | A6C3C3175845400BD2B738C43EE2645F |
| $m_{P18}$ | A0FD56258D2228642C6F641851C3751ED |
| $m_{P19}$ | EFA48C3FC84AC625783C6C9510A2269A |
| $m_{P20}$ | 62A8EB1A420334B23396E8D76BC19740 |
| $m_{P21}$ | 9E96235699D5D41C9816C921023BC741 |
| $m_{P22}$ | 4362AE4CAE0DCC32D60A3FED1341A848 |
| $m_{P23}$ | 454C068E6C4F190942E0904B95D61DFB |
| $m_{P24}$ | 607FEEA6E2E99206718A49C0D6A25034 |
| $m_{P25}$ | E1D1BCDA39A09095B5C81645103A077C |
| $m_{P26}$ | 994B445E558344DE211C8286DDD3D1A3 |
| $m_{P27}$ | C15233273581417638906ADB61FDCA3C |
| $m_{P28}$ | 8B79A274D542F096FB1388098230F8A1 |
| $m_{P29}$ | DF58AC1C5F44B2A40266385CE1DA5640 |

In Table 1 above, only 30 basic midambles are shown as an example out of 128 basic midambles disclosed in the aforementioned document. Hexadecimal digits of Table 1 above are attained by mapping binary elements of Table 2 below.

TABLE 2

| 4 binary$_{mi}$ elements | | | | Mapped on hexadecimal digit |
|---|---|---|---|---|
| −1 | −1 | −1 | −1 | 0 |
| −1 | −1 | −1 | 1 | 1 |
| −1 | −1 | 1 | −1 | 2 |
| −1 | −1 | 1 | 1 | 3 |
| −1 | 1 | −1 | −1 | 4 |
| −1 | 1 | −1 | 1 | 5 |
| −1 | 1 | 1 | −1 | 6 |
| −1 | 1 | 1 | 1 | 7 |
| 1 | −1 | −1 | −1 | 8 |
| 1 | −1 | −1 | 1 | 9 |
| 1 | −1 | 1 | −1 | A |
| 1 | −1 | 1 | 1 | B |
| 1 | 1 | −1 | −1 | C |
| 1 | 1 | −1 | 1 | D |
| 1 | 1 | 1 | −1 | E |
| 1 | 1 | 1 | 1 | F |

In the 1.28 Mcps TDD, a midamble has a duration of $L_m=144$, which is obtained by extending a basic midamble code having a duration of 128. The basic midamble code is unique within a cell. Different users are identified by cyclic-shifting the midamble in the same cell and the same time slot.

Figure 6:
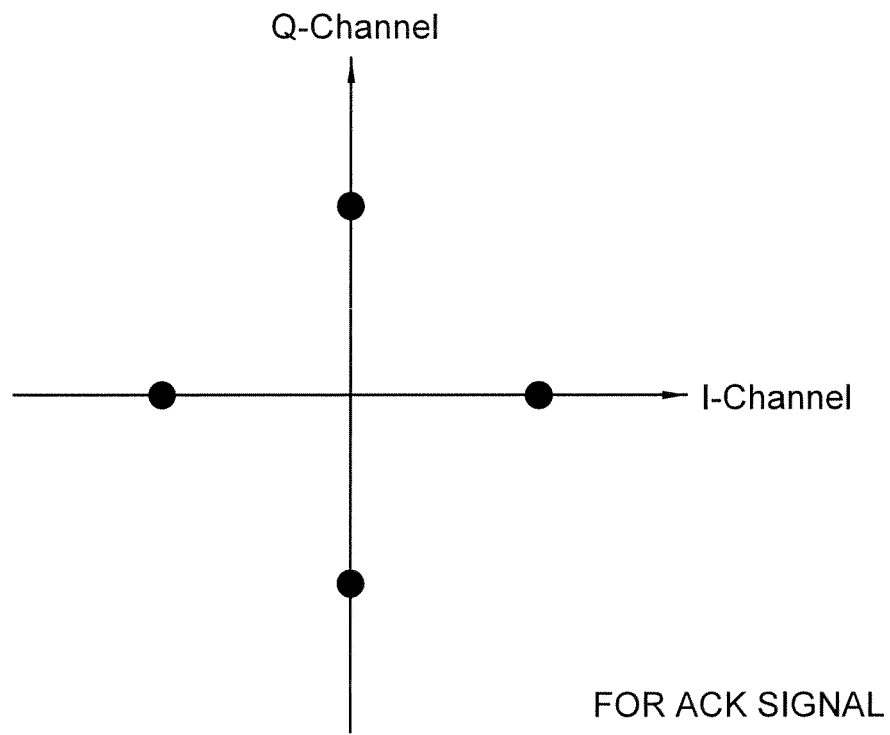
FIG. 6 shows transmission of acknowledgment (ACK)/negative acknowledgment (NACK) signals in a quadrature phase shift keying (QPSK) modulation scheme.
Figure 6:
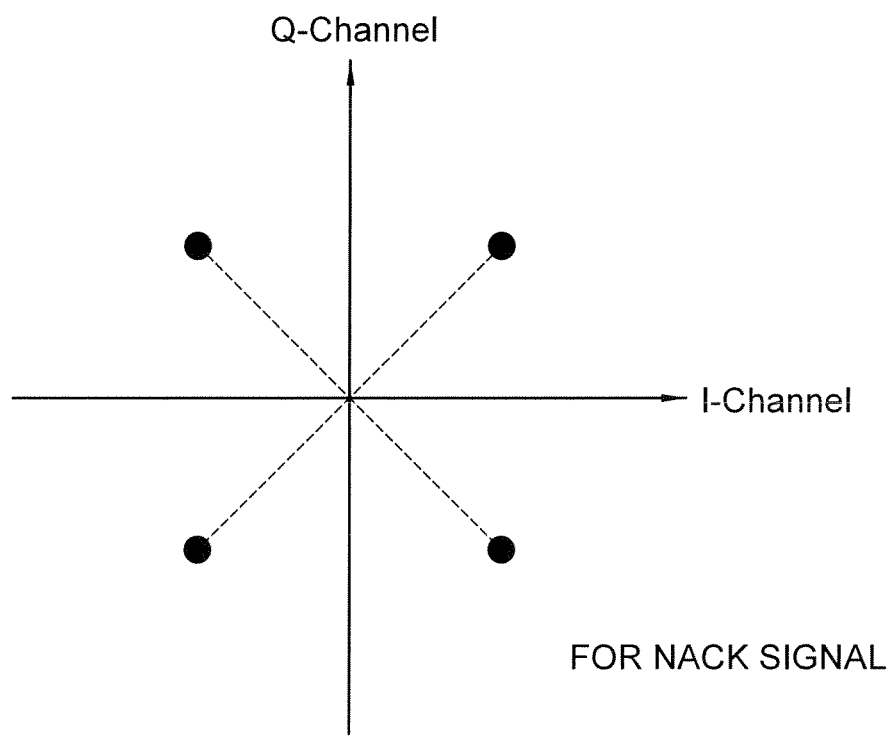

FIG. 6 shows transmission of ACK/NACK signals in a QPSK modulation scheme. An I-channel denotes an in-phase component, and a Q-channel denotes a quadrature-phase component. For the ACK signal, a midamble is modulated according to general QPSK. For the NACK signal, a phase of the midamble is shifted by $\pi/4$. The phase difference of $\pi/4$ is for exemplary purposes only, and thus the present invention can also be applied by those skilled in the art by using other modulation schemes (i.e., binary phase shift keying (BPSK), 16-QAM, etc.).

A BS can detect the ACK/NACK signals by using the phase of the midamble according to several methods. First, the ACK/NACK detection can be achieved by calculating a phase difference of midambles for a dedicated channel (DCH) or an enhanced dedicated channel (E-DCH) which is used together with an HS-SICH. The BS already knows the phase of the midamble for the DCH or the E-DCH. Therefore, the phase of the midamble for the HS-SICH can be known by subtracting the phase of the midamble for the DCH or the E-DCH from the phase of the midamble for the HS-SICH. Second, the ACK/NACK detection can be achieved by comparing a phase of a channel estimation value obtained from the midamble for the DCH or the E-DCH used together with the HS-SICH and a phase of a channel estimation value obtained from the midamble for the HS-SICH. Third, the ACK/NACK detection can be achieved in such a manner that a demodulated phase of the midamble for the HS-SICH is modulated to 45 degrees and, if the modulation result is close to 0, the ACK signal is detected, and otherwise, the NACK is detected.

A UE transmits not only data symbols through the HS-SICH but also the ACK/NACK signals carried on the midamble. The BS detects not only the data symbols but also the ACK/NACK signals through the midamble. The BS can identify the ACK signal and the NACK signal by determining whether the phase of the midamble is equal to the phases of the data symbols. For example, if the phase of the midamble is equal to the phases of the data symbols, it is determined that the ACK signal is received, and otherwise, it is determined that the NACK signal is received. Therefore, if the phase of the midamble can be known, the ACK/NACK detection can be achieved.

The ACK/NACK signals carried on the midamble can be used as an auxiliary means for detecting the ACK/NACK signals carried on the data symbols. Since the same ACK/NACK signals are carried on the midamble and the data symbols through the HS-SICH, transmission reliability can be improved. In addition, transmit power for the HS-SICH can be reduced.

According to another embodiment, cyclic shift may be differently applied to a midamble when transmitting ACK/NACK signals. For example, the ACK signal is transmitted without cyclic shift, and the NACK signal is transmitted by cyclic-shifting the midamble according to a predetermined cyclic shift value.

According to another embodiment, midambles may be configured differently depending on ACK/NACK signals. That is, a first midamble can be assigned for the ACK signal, and a second midamble can be assigned for the NACK signal. A BS pre-assigns the first and second midambles to be used. A UE receives information regarding the first and second midambles. Thereafter, the UE transmits the first midamble when the ACK signal is detected, and transmits the second midamble when the NACK signal is detected.

Figure 7:
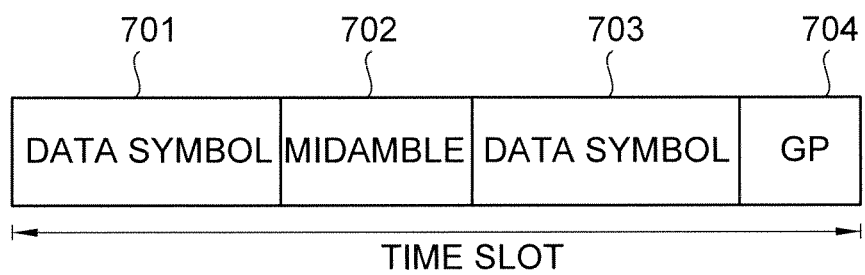
FIG. 7 shows a structure of a burst for an uplink physical channel.

FIG. 7 shows a structure of a burst for an uplink physical channel.

Referring to FIG. 7, the burst used in the uplink physical channel includes data symbols 701 and 703, a midamble 702, and a guard period (GP) 704. The data symbols 701 and 703 are used to transmit data. The midamble 702 is used not only to identify UEs that use the same time slots but also to estimate a channel. The GP 704 is an interval for distinguishing a time slot for current transmission from a subsequent time slot for next transmission.

The midamble 702 can carry control information. The control information may be the same control information as that carried on the data symbols 701 and 703. For example, if the control information is an ACK/NACK signal, the ACK/NACK signal is carried on not only the data symbols 701 and 703 but also the midamble 702, thereby improving transmission reliability. In addition, if the control information is a CQI, the CQI is carried on not only the data symbols 701 and 703 but also the midamble 702, thereby improving transmission reliability. The control information may be carried by varying a phase of the midamble or by using different midambles.

Figure 8:
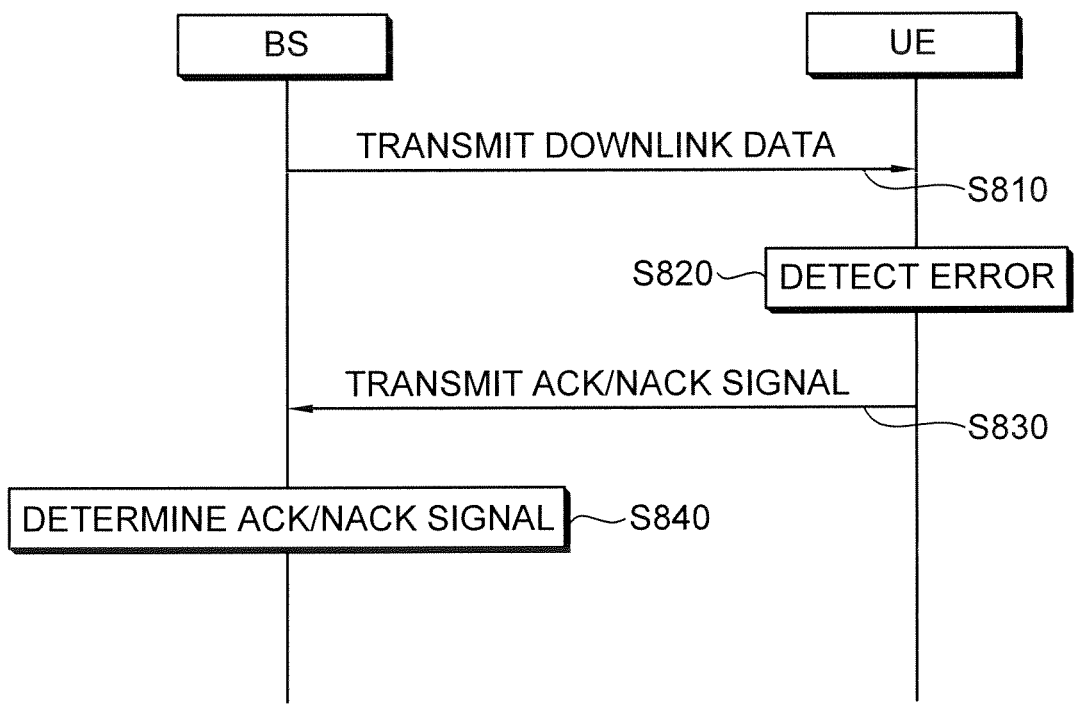
FIG. 8 is a flow diagram showing a method of performing hybrid automatic repeat request (HARQ) according to an embodiment of the present invention.

FIG. 8 is a flow diagram showing a method of performing HARQ according to an embodiment of the present invention.

Referring to FIG. 8, a BS transmits downlink data to a UE through an HS-DSCH (step S810). The UE detects an error from the received downlink data (step S820).

The UE transmits ACK/NACK signals through an HS-SICH (step S830). If no error is detected from the downlink data, the UE transmits the ACK signal to the BS. Otherwise, upon detecting the error, the UE transmits the NACK signal to the BS. The UE transmits the ACK/NACK signals by carrying the ACK/NACK signals on not only data symbols constituting a burst used in the HS-SICH but also a midamble.

The BS determines whether a signal transmitted from the US is either the ACK signal or the NACK signal (step S840). The ACK/NACK signals are transmitted by being carried on the midamble along with the data symbols. Therefore, detection of the ACK/NACK signals can be finally made by considering a decoding result of the ACK/NACK signals on the data symbols as well as the ACK/NACK signals on the midamble. The BS transmits new data upon receiving the ACK signal and retransmits data upon receiving the NACK signal. In this case, the retransmitted data may be data generated according to a HARQ scheme determined between the UE and the BS.

Transmission reliability can be improved even if control information is transmitted on an uplink shared channel. Therefore, reception errors in a base station can be reduced. If the control information is an ACK/NACK signal for HARQ, the HARQ can be prevented from being mistakenly performed. In addition, since the same performance can be achieved with less transmit power in comparison with the convention method, remaining power can be allocated to other channels (e.g., DCH or E-DCH), thereby increasing transmission capacity of uplink data. Thus, uplink control information can be transmitted with less transmit power. As a result, power consumed in a UE is reduced and an available time of use can be increased. Since midamble detection is generally performed faster than data decoding, the ACK/NACK signal can be detected faster by using only the midamble.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of transmitting control information in a wireless communication system, the method comprising:
configuring a burst including data symbols and a midamble, wherein the data symbols carry an acknowledgement/negative acknowledgement (ACK/NACK) signal, and the midamble carries the same ACK/NACK signal for detecting the ACK/NACK signal carried on the data symbols; and
transmitting the burst through a high speed shared information channel (HS-SICH) which is a shared information channel for a high speed downlink shared channel (HS-DSCH).

2. The method of claim 1, wherein the midamble is modulated by a different phase according to whether the ACK/NACK signal carried on the data symbols is either an ACK signal or a NACK signal.

3. The method of claim 2, wherein the midamble is quadrature phase shift keying (QPSK) modulated by a phase 0 if the ACK signal is carried on the data symbols, and the midamble is QPSK modulated by a phase $\pi/4$ if the NACK signal is carried on the data symbols.

4. The method of claim 1, wherein the midamble is cyclic-shifted differently according to whether the ACK/NACK signal carried on the data symbols is either an ACK signal or a NACK signal.

5. The method of claim 1, wherein the midamble is configured differently according to whether the ACK/NACK signal carried on the data symbols is either an ACK signal or a NACK signal.

6. The method of claim 5, wherein a first midamble is assigned in the burst if the ACK signal is carried on the data symbols, and a second midamble is assigned in the burst if the NACK signal is carried on the data symbols.

7. A method of performing hybrid automatic repeat request (HARQ) in a wireless communication system, the method comprising:
receiving downlink data; and
transmitting an acknowledgment (ACK)/negative acknowledgement (NACK) signal for the downlink data through a burst,
wherein the burst includes data symbols and a midamble, the data symbols carrying the ACK/NACK signal, and the midamble carrying the same ACK/NACK signal for detecting the ACK/NACK signal carried on the data symbols, and
wherein the burst is transmitted on a high speed shared information channel (HS-SICH) which is a shared information channel for a high speed downlink shared channel (HS-DSCH).

8. The method of claim 7, wherein the midamble is modulated by a different phase according to whether the ACK/NACK signal carried on the data symbols is either an ACK signal or a NACK signal.

9. The method of claim 7, wherein the midamble is cyclic-shifted differently according to whether the ACK/NACK signal carried on the data symbols is either an ACK signal or a NACK signal.

10. The method of claim 7, wherein the midamble is configured differently according to whether the ACK/NACK signal carried on the data symbols is either an ACK signal or a NACK signal.

11. A user equipment in a wireless communication system, the user equipment comprising:
a radio frequency (RF) unit for transmitting or receiving a radio signal; and
a processor coupled to the RF unit and configured for:
configuring a burst including data symbols and a midamble, wherein the data symbols carry an acknowledgement/negative acknowledgement (ACK/NACK) signal, and the midamble carries the same ACK/NACK signal for detecting the ACK/NACK signal carried on the data symbols, and
transmitting the burst through a high speed shared information channel (HS-SICH) which is a shared information channel for a high speed downlink shared channel (HS-DSCH).

* * * * *